United States Patent
Roehrl et al.

(10) Patent No.: US 9,840,149 B2
(45) Date of Patent: Dec. 12, 2017

(54) VEHICLE ELECTRICAL DISTRIBUTION SYSTEM AND METHOD FOR OPERATING A VEHICLE ELECTRICAL DISTRIBUTION SYSTEM

(71) Applicant: CONTINENTAL AUTOMOTIVE GMBH, Hannover (DE)

(72) Inventors: Thomas Roehrl, Barbing (DE); Birgit Roesel, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 677 days.

(21) Appl. No.: 14/369,295

(22) PCT Filed: Dec. 17, 2012

(86) PCT No.: PCT/EP2012/075728
§ 371 (c)(1),
(2) Date: Jun. 27, 2014

(87) PCT Pub. No.: WO2013/098105
PCT Pub. Date: Jul. 4, 2013

(65) Prior Publication Data
US 2014/0354046 A1 Dec. 4, 2014

(30) Foreign Application Priority Data
Dec. 27, 2011 (DE) .................. 10 2011 089 996

(51) Int. Cl.
*B60L 11/18* (2006.01)
*B60R 16/03* (2006.01)
(52) U.S. Cl.
CPC .............. *B60L 11/18* (2013.01); *B60R 16/03* (2013.01)

(58) Field of Classification Search
CPC ..... B60L 11/18; B60R 16/03; B60R 16/0315; B60R 21/017; Y02T 10/7005; H02J 7/1438
(Continued)

(56) References Cited

U.S. PATENT DOCUMENTS 5,029,660 A * 7/1991 Raad ................ B62D 6/00
180/422
5,155,399 A * 10/1992 Zimmermann ....... H02P 25/034
310/23

(Continued)

FOREIGN PATENT DOCUMENTS

CN 101503063 A 8/2009
DE 29909901 U1 9/1999
(Continued)

*Primary Examiner* — Thienvu Tran
*Assistant Examiner* — Brian K Baxter
(74) *Attorney, Agent, or Firm* — Laurence A. Greenberg; Werner H. Stemer; Ralph E. Locher

(57) ABSTRACT

A vehicle electrical system has at least one vehicle distribution branch and at least one energy storage device. The system additionally has at least one switching device which is able to assume a first switching position and a second switching position. The at least one energy storage device is electrically connected to the at least one vehicle distribution branch in the first switching position. Furthermore, the at least one energy storage device is electrically separated from the at least one vehicle distribution branch in the second switching position. A control device controls the switching device by way of a control signal that can be generated by a pulse length modulator. A pulse width of the control signal can be adapted according to a momentary supply voltage of the switching device or a momentary temperature of the switching device.

16 Claims, 4 Drawing Sheets

(58) Field of Classification Search
USPC .................................................. 307/10.1
See application file for complete search history.

(56) References Cited

U.S. PATENT DOCUMENTS

| | | | | |
|---|---|---|---|---|
| 6,366,441 | B1* | 4/2002 | Ozawa | F01L 9/04 361/170 |
| 6,549,390 | B1* | 4/2003 | Ozawa | F01L 9/04 361/139 |
| 6,762,745 | B1* | 7/2004 | Braun | G06F 3/016 318/568.11 |
| 8,300,380 | B2 | 10/2012 | Brutschin et al. | |
| 2005/0071098 | A1* | 3/2005 | Iannone | F02D 41/20 702/65 |
| 2005/0151515 | A1* | 7/2005 | Isurin | H02P 9/305 322/28 |
| 2009/0261766 | A1* | 10/2009 | Lurk | H02P 1/04 318/400.42 |
| 2009/0316320 | A1* | 12/2009 | Maeda | B60R 16/03 361/92 |
| 2010/0204871 | A1* | 8/2010 | Bange | H02M 3/156 701/31.4 |
| 2010/0289603 | A1 | 11/2010 | Meid | |
| 2011/0121771 | A1* | 5/2011 | Emoto | G01R 31/025 318/490 |
| 2011/0175555 | A1* | 7/2011 | Daemmrich | F01N 3/208 318/135 |
| 2011/0270489 | A1 | 11/2011 | Gustmann et al. | |

FOREIGN PATENT DOCUMENTS

| | | |
|---|---|---|
| DE | 102007031995 A1 | 1/2009 |
| DE | 102007061180 A1 | 7/2009 |
| DE | 102008040810 A1 | 2/2010 |
| DE | 202010004384 U1 | 8/2010 |
| EP | 1300862 A1 | 4/2003 |
| JP | H0817315 A | 1/1996 |
| JP | 2000090797 A | 3/2000 |
| JP | 2002270075 A | 9/2002 |
| JP | 2010532958 A | 10/2010 |
| JP | 2011240770 A | 12/2011 |

* cited by examiner

VEHICLE ELECTRICAL DISTRIBUTION SYSTEM AND METHOD FOR OPERATING A VEHICLE ELECTRICAL DISTRIBUTION SYSTEM

BACKGROUND OF THE INVENTION

Field of the Invention

The application relates to a vehicle electrical distribution system, to a vehicle comprising a vehicle electrical distribution system and to a method for operating a vehicle electrical distribution system.

DE 10 2008 040 810 A1 discloses a vehicle electrical distribution system for a motor vehicle. The vehicle electrical distribution system has a vehicle electrical distribution network comprising electrical consumers connected thereto, comprising electrical energy generation apparatuses connected thereto, and at least one energy store. The energy store can be isolated from the vehicle electrical distribution network via a switching apparatus. At least one switching apparatus monitoring apparatus is provided which checks the operating state of the switching apparatus.

BRIEF SUMMARY OF THE INVENTION

The object of the application consists in specifying a vehicle electrical distribution system, a vehicle comprising a vehicle electrical distribution system and a method for operating a vehicle electrical distribution system which make it possible to save energy during operation of the vehicle electrical distribution system.

This object is achieved by the subject matter of the independent claims. Advantageous developments can be gleaned from the dependent claims. In accordance with one aspect of the application, a vehicle electrical distribution system has at least one vehicle electrical distribution branch and at least one energy storage apparatus. In addition, the vehicle electrical distribution system has at least one switching apparatus, wherein the at least one switching apparatus can assume a first switch position and a second switch position. In the first switch position, the at least one energy storage apparatus is electrically connected to the at least one vehicle electrical distribution branch. Furthermore, in the second switch position, the at least one energy storage apparatus is electrically isolated from the at least one vehicle electrical distribution branch. In addition, the vehicle electrical distribution system has an actuation unit, which is designed to actuate the at least one switching apparatus by means of an actuation signal which can be generated by a pulse width modulator. A pulse width of the actuation signal can be adjusted depending on at least one parameter, selected from the group consisting of an instantaneous supply voltage of the at least one switching apparatus and an instantaneous temperature of the at least one switching apparatus.

The vehicle electrical distribution system in accordance with said embodiment makes it possible to save energy during operation of the vehicle electrical distribution system. This takes place by virtue of the provision of the actuation unit, which is designed to actuate the at least one switching apparatus, in which a pulse width of the actuation signal can be adjusted depending on the instantaneous supply voltage and/or the instantaneous temperature of the at least one switching apparatus. The terms pulse width and pulse duration can in this case be used analogously. Thus, an influence that the temperature or the supply voltage has in the case of actuation of the at least one switching apparatus during operation of the vehicle electrical distribution system can be reduced as much as possible or virtually eliminated. This makes it possible to operate the switching apparatus in a further improved manner with as low an actuation power as possible.

The at least one switching apparatus is preferably selected from the group consisting of a relay, in particular a high voltage relay, and a contactor, in particular a high-voltage contactor. In this configuration, the actuation unit is designed to actuate a field coil of the at least one switching apparatus, i.e. a field coil of the relay or of the contactor.

The switching apparatus is in this case preferably in the form of a so-called normally open contact. In this case, a normally open contact is understood to mean a switching apparatus which is open when the armature is in the dropped-out state or in the case of a de-energized field coil and is closed when the armature is in the picked-up state or when a current is flowing through the field coil. However, it is also possible for the switching apparatus to be in the form of a normally closed contact, i.e. a contact which, in the picked-up state, electrically isolates the at least one energy storage apparatus from the at least one vehicle electrical distribution branch. Thus, electrical connection of the at least one energy storage apparatus to the at least one vehicle electrical distribution branch or electrical isolation of the at least one energy storage apparatus from the at least one vehicle electrical distribution branch can each take place with adjustment of the pulse width of the actuation signal.

In a further embodiment, the vehicle electrical distribution system additionally has a first determination unit, which is designed to determine at least one variable characterizing an instantaneous temperature of the field coil of the at least one switching apparatus. The first determination unit can have a temperature sensor for this purpose. In this case, the temperature sensor is arranged in the region of the field coil, for example. Thus, the instantaneous temperature of the field coil can be determined directly. Furthermore, the temperature sensor can be designed to determine a temperature in the region of a surrounding environment of the vehicle electrical distribution system, i.e. a temperature which is not determined directly in the region of the field coil. In this configuration, the first determination unit can be designed to determine or estimate an instantaneous temperature of the field coil on the basis of the determined temperature and a temperature model. The temperature model can include, for example, a switch-on duration of the at least one switching apparatus.

In a further configuration, the first determination unit is designed to determine an instantaneous electrical resistance of the field coil of the at least one switching apparatus. An instantaneous temperature of the field coil can in this case be determined by means of a corresponding resistance/temperature characteristic.

The vehicle electrical distribution system can also have a second determination unit, which is designed to determine the instantaneous supply voltage of the at least one switching apparatus. The second determination unit can in this case in particular be designed to determine an instantaneous supply voltage of the field coil of the at least one switching apparatus in the form of a relay or a contactor.

In a further configuration, the pulse width modulator can have an input, at which the instantaneous supply voltage can be provided or applied. In this configuration, the pulse width modulator is designed to adjust the pulse width of the actuation signal depending on the instantaneous supply voltage which can be applied at the input.

Furthermore, the application relates to a vehicle which has a vehicle electrical distribution system in accordance with one of the cited embodiments. The vehicle is, for example, a motor vehicle, in particular a passenger vehicle or a truck, and can be in the form of a hybrid vehicle, a vehicle with only an internal combustion engine drive or a vehicle with only an electric drive motor.

The application also relates to a method for operating a vehicle electrical distribution system, wherein the vehicle electrical distribution system has at least one vehicle electrical distribution branch, at least one energy storage apparatus and at least one switching apparatus. The at least one switching apparatus can assume a first switch position and a second switch position, wherein, in the first switch position, the at least one energy storage apparatus is electrically connected to the at least one vehicle electrical distribution branch, and wherein, in the second switch position, the at least one energy storage apparatus is electrically isolated from the at least one vehicle electrical distribution branch. The method has the following steps. Generation of an actuation signal for actuating the at least one switching apparatus by means of a pulse width modulator takes place. In addition, determination of at least one parameter, selected from the group consisting of an instantaneous supply voltage of the at least one switching apparatus and a variable characterizing an instantaneous temperature of the at least one switching apparatus, takes place. Furthermore, adjustment of a pulse width of the actuation signal depending on the at least one determined parameter takes place.

The vehicle and the method in accordance with the application have the advantages already mentioned in connection with the vehicle electrical distribution system in accordance with the application, which advantages will not be detailed again at this juncture so as to avoid a repetition.

In one embodiment of the method, the pulse width of the actuation signal is reduced at an increased value for the instantaneous supply voltage and/or at a reduced value for the instantaneous temperature. In a further configuration, the pulse width of the actuation signal is increased at a reduced value for the instantaneous supply voltage and/or at an increased value for the instantaneous temperature. Thus, any influence of the temperature or the supply voltage in the case of actuation of the at least one switching apparatus can be reduced as much as possible.

The at least one switching apparatus is preferably selected from the group consisting of a relay, in particular a high-voltage relay, and a contactor, in particular a high-voltage contactor. In one embodiment, the adjustment of the pulse width takes place in this case after a predetermined period of time after an actuation signal for pickup of the at least one switching apparatus in the form of a relay or a contactor. In this case, pickup of the relay or contactor is understood to mean that an armature of the relay or of the contactor is picked up by the field coil when a current is flowing through said field coil. Said embodiment is based on the consideration that a relatively high power consumption in comparison with a picked-up state is required for pickup of the switching apparatus and therefore pulse width modulation should only be performed when the relay or contactor is in the picked-up state. In this case, a switching duration can be taken into consideration by means of the predetermined time period.

In a further embodiment, in which the at least one switching apparatus is selected from the group consisting of a relay, in particular a high-voltage relay, and a contactor, in particular a high-voltage contactor, in addition it is determined whether pickup of the at least one switching apparatus has taken place. Thus, it is determined whether pickup of the relay or the contactor has taken place. In this embodiment, the adjustment of the pulse width takes place if it is determined that pickup of the at least one switching apparatus has taken place. Thus, in turn the increased power consumption is taken into consideration in the case of a relay or contactor which is not in the picked-up state, wherein, in this embodiment, in addition pickup of the switching apparatus is determined. Thus, the adjustment of the pulse width can be performed as close in time as possible after a switching operation of the at least one switching apparatus has taken place.

The determination of a parameter characterizing an instantaneous temperature of the at least one switching apparatus includes, in one configuration of the method, a determination of an instantaneous electrical resistance of a field coil of the at least one switching apparatus in the form of a relay or a contactor.

If the at least one switching apparatus in the form of a relay or a contactor has been picked up, the method in one embodiment furthermore has the following steps. A reduction in the pulse width of the actuation signal takes place. In addition, a determination as to whether the at least one switching apparatus has dropped out, i.e. a determination as to whether the at least one switching apparatus is no longer in the picked-up state, takes place. If it is determined that the at least one switching apparatus has not dropped out, actuation of the at least one switching apparatus takes place by means of an actuation signal having the reduced pulse width. In this case, it is assumed that a reduced pulse width enables a further saving of energy, but it should be taken into consideration here that the relay or contactor also continues to remain in the picked-up state at a reduced pulse width.

The mentioned steps are preferably implemented repeatedly until it is determined that the at least one switching apparatus has dropped out. Thus, a lower limit of the reduced pulse width can be determined. These steps can in this case in particular take place prior to the steps for generating an actuation signal, determining the at least one parameter and adjusting a pulse width of the actuation signal depending on the at least one determined parameter. Thus, first the lower limit for the reduced pulse width can be determined and then the pulse width of the actuation signal can be adjusted depending on the temperature and/or the supply voltage.

Embodiments of the application will now be explained in more detail with reference to the attached figures.

DESCRIPTION OF THE INVENTION

Figure 1A:
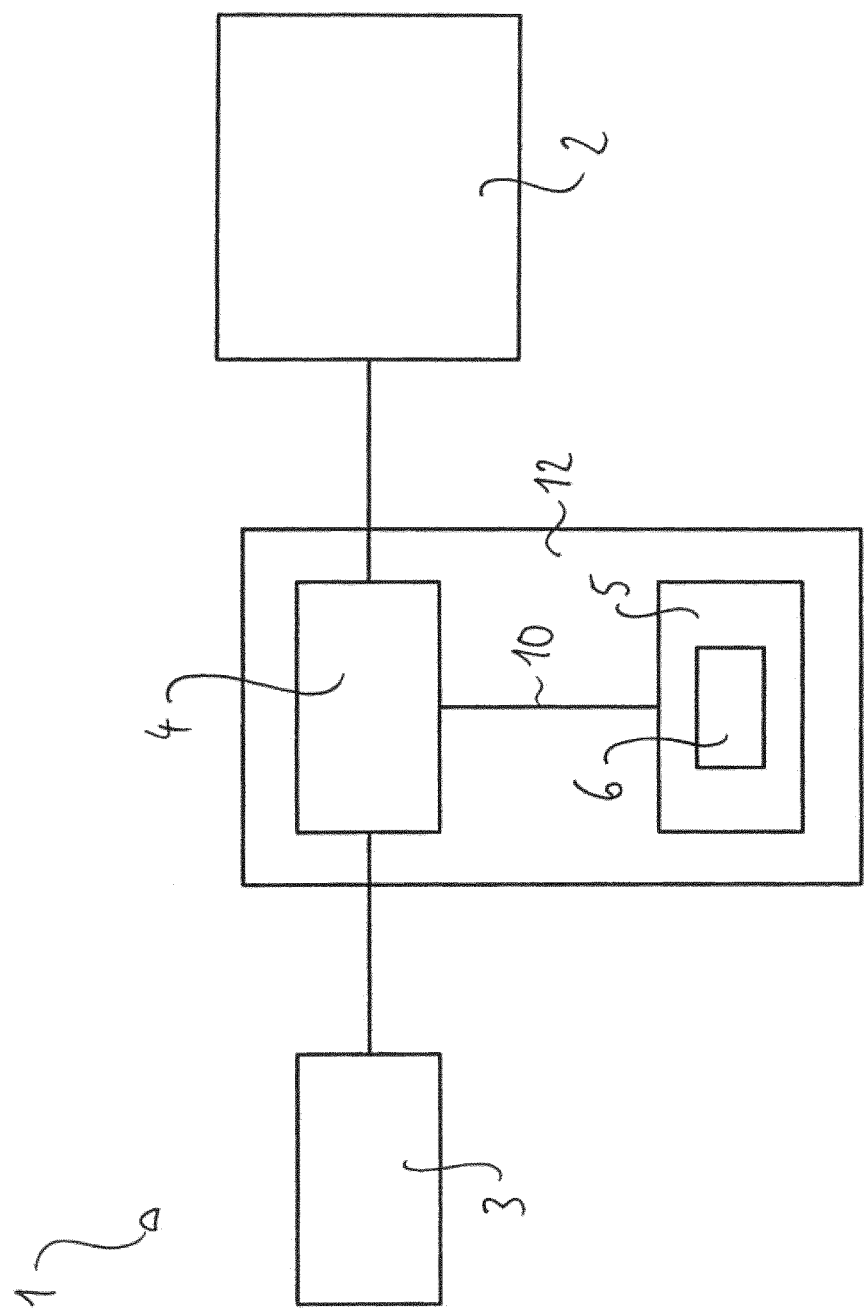
FIG. 1A shows a basic circuit diagram of a vehicle electrical distribution system in accordance with one embodiment of the application.

FIG. 1A shows a schematic basic circuit diagram of a vehicle electrical distribution system 1 in accordance with one embodiment of the application.

The vehicle electrical distribution system 1 can be part of a motor vehicle (not illustrated in any more detail), in particular a passenger vehicle or a truck. For example, the vehicle electrical distribution system 1 can be in the form of a high-voltage system of an electric vehicle.

The vehicle electrical distribution system 1 has a first vehicle electrical distribution branch 2 having a nominal voltage of 48 V, for example. In particular electrical consumers, voltage converters, in particular in the form of a C-to-DC converter, and/or electrical energy generation apparatuses can be arranged in the first vehicle electrical distribution branch 2, but said devices are not illustrated in any more detail in the figures for reasons of clarity.

In addition to the first vehicle electrical distribution branch 2, the vehicle electrical distribution system 1 can have further vehicle electrical distribution branches, wherein a nominal voltage in the further vehicle electrical distribution branches can correspond to the nominal voltage of the first vehicle electrical distribution branch 2 or can differ therefrom. The further vehicle electrical distribution branches can likewise have electrical consumers, voltage converters and/or electrical energy generation apparatuses and are not illustrated in any more detail in the figures for reasons of clarity. Consumers or loads can in this case be, for example, power electronics of a vehicle drive, an electric air-conditioning compressor, a heater or a charger.

The vehicle electrical distribution system 1 also has an electrical energy storage apparatus 3, for example in the form of a 12 volt rechargeable battery.

In addition, the vehicle electrical distribution system 1 has at least one switching apparatus 4 (illustrated schematically), wherein the switching apparatus 4 can assume a first switch position and a second switch position. In this case, in the first switch position, the energy storage apparatus 3 is electrically connected to the first electrical distribution branch 2, and, in the second switch position is electrically isolated from the first vehicle electrical distribution branch 2.

Furthermore, the vehicle electrical distribution system 1 has an actuation unit 5, which is designed to actuate the at least one switching apparatus 4 by means of an actuation signal which can be generated by a pulse width modulator 6. The actuation unit 5 is connected to the at least one switching apparatus 4 via a control line 10 for this purpose. As is explained in more detail in connection with the attached figures, a pulse width of the actuation signal can be adjusted depending on at least one parameter, selected from the group consisting of an instantaneous supply voltage of the switching apparatus 4 and an instantaneous temperature of the switching apparatus 4.

In the embodiment shown, the switching apparatus 4 and the actuation unit 5 are arranged in a distribution unit 12.

Thus, the control line 10 can be kept as short as possible, whereby the electromagnetic compatibility can be improved. By means of the distribution unit 12, which can also be referred to as a high-voltage junction box (HVJB) or a power distribution unit (PDU), the poles (not illustrated in more detail in FIG. 1A) of the electrical energy storage apparatus 3 can be multiplied to give a plurality of taps.

In order to further increase safety, the voltage, in particular the high voltage, can be measured in the distribution unit 12 and the information as to whether there is a high voltage on the relevant branch or not can be communicated to further electronics (not illustrated in any more detail). In addition, this measurement can be formed with redundancy with the result that single faults can be detected.

Figure 1B:
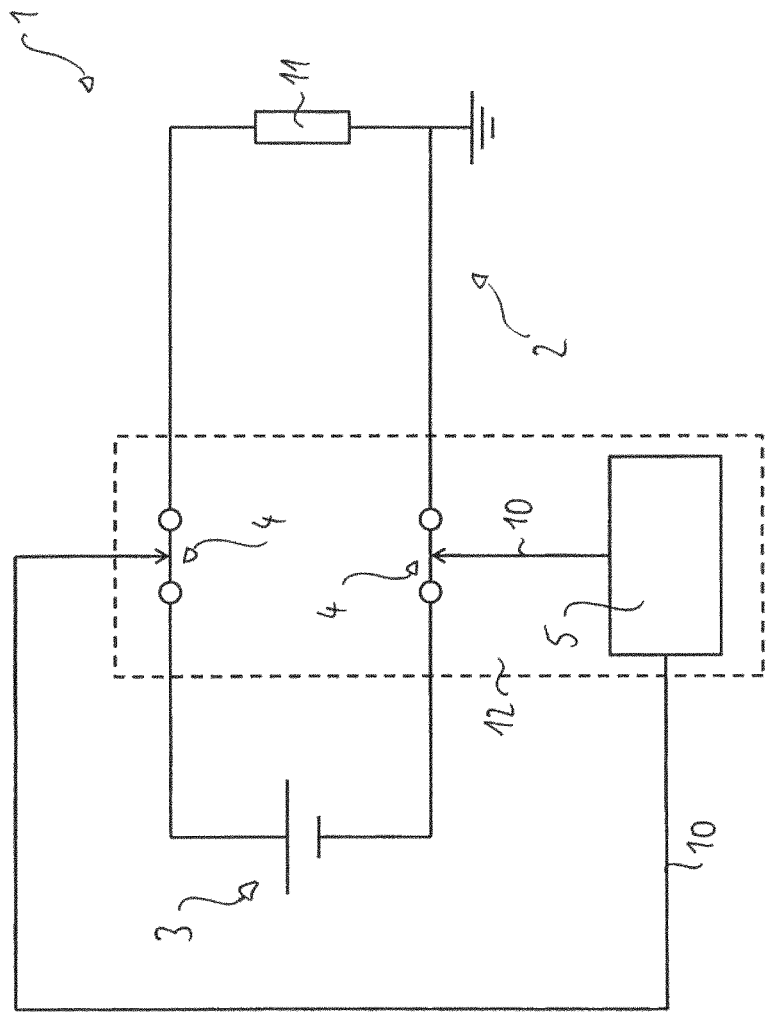
FIG. 1B shows a block circuit diagram of the vehicle electrical distribution system as shown in FIG. 1A.

FIG. 1B shows a block circuit diagram of the vehicle electrical distribution system 1 shown in FIG. 1A. Components with the same functions as in FIG. 1A are identified by the same reference symbols and will not be explained again below.

As illustrated in FIG. 1B, the energy storage apparatus 3 has two poles in the form of a positive pole and a negative pole, which make available the supply voltage for the first vehicle electrical distribution branch 2. In addition, FIG. 1B shows, schematically, an electrical consumer 11 arranged in the first vehicle electrical distribution branch 2, for example an electric air-conditioning compressor or a heater. As already explained, the vehicle electrical distribution system 1 can also have a plurality of consumers or devices which can tap off the central supply voltage of the energy storage apparatus 3 and are arranged in different vehicle electrical distribution branches, for example.

In the first switch position (shown in FIG. 1B) of the two switching apparatuses 4, the energy storage apparatus 3 is electrically connected to the first vehicle electrical distribution branch 2. In the second switch position (not illustrated) of the switching apparatuses 4, the energy storage apparatus 3 is electrically isolated from the first vehicle electrical distribution branch 2.

In the embodiment shown, both the positive connection and the negative connection of the energy storage apparatus 3 has a dedicated switching apparatus 4. The switching apparatuses 4 are in this case selected from the group consisting of a relay, in particular a high-voltage relay, and a contactor, in particular a high-voltage contactor. Thus, both poles, both the positive pole and the negative pole, can be connected. In the embodiment shown, two separate switching apparatuses 4 are provided for the first vehicle electrical distribution branch 2 and therefore for a high-voltage path. In a further configuration, a so-called double contactor can also be provided.

The actuation unit 5 is designed to actuate the two switching apparatuses 4 by means of in each case one actuation signal which can be generated by a pulse width modulator (not illustrated in any more detail in FIG. 1B). For this purpose, the actuation unit 5 is connected to the two switching apparatuses 4 via in each case one control line 10.

The two switching apparatuses 4 and the actuation unit 5 are arranged in the distribution unit 12, as already explained above, in the embodiment shown.

As will be explained in more detail in connection with the attached figures, a pulse width of the respective actuation signal can be adjusted depending on at least one parameter, selected from the group consisting of an instantaneous supply voltage of the respective switching apparatus 4 and an instantaneous temperature of the switching apparatus 4. In the embodiment shown, the supply voltages and temperatures of the two switching apparatuses 4 are in each case approximately identical, whereby actuation can take place in a simple manner.

In the embodiment shown, the switching apparatuses 4 are designed as so-called normally open contacts, which are also referred to as make contacts. In this case, a normally open contact is understood to mean a switching apparatus which is open when the armature is in the dropped-out state or in the case of a de-energized field coil and is closed when the armature is in the picked-up state or when a current is flowing through the field coil. However, it is also possible for the switching apparatuses 4 to be in the form of normally closed contacts, i.e. contacts which, in the picked-up state, electrically isolate the energy storage apparatus 3 from the first vehicle electrical distribution branch 2.

Figure 1C:
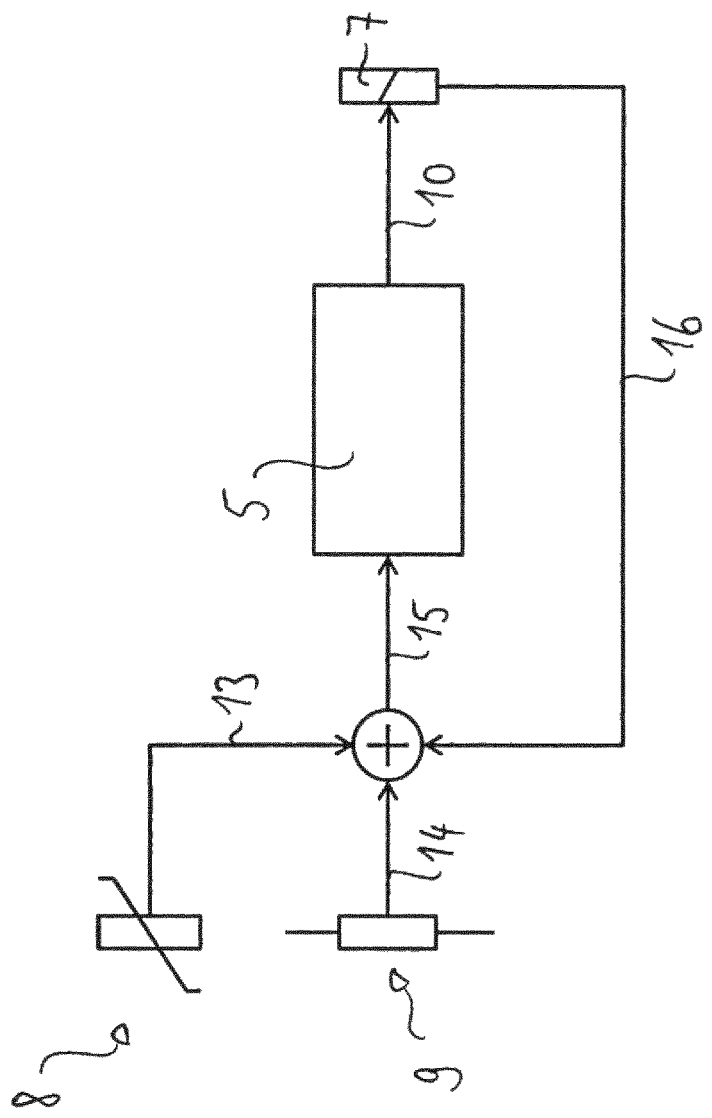
FIG. 1C shows components of the vehicle electrical distribution system as shown in FIGS. 1A and 1B.

FIG. 1C shows components of the vehicle electrical distribution system as shown in FIGS. 1A and 1B.

In this case, FIG. 1C again shows the actuation unit 5. As illustrated in FIG. 1C, the actuation unit 5 is designed to actuate a field coil 7 of the respective switching apparatus, wherein only one field coil 7 is illustrated in FIG. 1C for reasons of clarity. The actuation unit 5 is connected to the field coil 7 via the control line 10 for this purpose.

The switching apparatuses (not illustrated in any more detail in FIG. 1C) require an intrinsic power of between 2 and 5 watts on the coil side, for example. This results in a total actuation power which typically is no longer negligible, in particular in a vehicle electrical distribution network of the vehicles. In addition, increased cross sections of the copper lines are required, which increases the associated costs and the weight and additionally causes lost heat. The mentioned effects can advantageously be reduced by means of the embodiments of the application.

For this purpose, a pulse width of the actuation signal can be adjusted depending on an instantaneous supply voltage of the respective field coil 7 and an instantaneous temperature of the respective field coil 7.

In this case, in the embodiment shown, the vehicle electrical distribution system has a first determination unit 8, which is designed to determine a variable characterizing an instantaneous temperature of the field coil 7. The first determination unit 8 can have in particular a temperature sensor for this purpose. Furthermore, the vehicle electrical distribution system has a second determination unit 9, which is designed to determine the instantaneous supply voltage of the respective field coil 7.

The determined temperature variable is passed over a signal line 13 and the determined instantaneous supply voltage is passed over a signal line 14 and then these are communicated to the actuation unit 5 over a common signal line 15.

On the basis of the determined values, the pulse width of the actuation signal generated by a pulse width modulator (not illustrated in any more detail in FIG. 1C) is adjusted. In this case, the pulse width of the actuation signal is reduced at an increased value for the instantaneous supply voltage and/or at a reduced value for the instantaneous temperature. Furthermore, the pulse width of the actuation signal is increased at a reduced value for the instantaneous supply voltage and/or at an increased value for the instantaneous temperature. A reduction in the pulse width is in this case equally as important as increasing an interval between the individual pulses or is equally as important as reducing the duty factor, wherein the duty factor is defined as the ratio between the switch-on time and the total duration of the corresponding actuation interval. Correspondingly, an increase in the pulse width is equally as important as a reduction in the interval between the individual pulses or an increase in the duty factor.

The actuation signal adjusted in this way is applied to the field coil 7 via the control line 10. As is furthermore illustrated by a signal line 16 routed back from the field coil 7, regulation of the pulse width can thus take place depending on the instantaneous temperature and the instantaneous supply voltage.

By means of the embodiment shown in FIGS. 1A to 1C, it is possible to save as much energy as possible even taking into consideration safety aspects in particular in the high-voltage range of a vehicle by means of temperature tracking and voltage tracking. The energy saving in this case advantageously results in a reduced level of emission of waste gases, in particular a reduced emission of $CO_2$, or lower energy consumption in electric vehicles, whereby the range of the electric vehicles can advantageously be increased. The switching apparatuses 4, for example in the form of contactors, are in this case subjected to pulse width modulation (PWM) after a switching operation, which is typically at an end after a few milliseconds, in order to decrease the power in the hold state. The gap in voltage supply occurring during the pulse width modulation in this case needs to be kept so small or so short that the selected relay cannot follow owing to its inertia and therefore remains in the picked-up state. In addition, care should be taken to ensure that the continuing pulse gaps do not result in the total actuation power being reduced to such an extent that there is no longer sufficient holding force for the relay. Then, it would drop out again, i.e. would be switched off in an undesirable manner, which could result in undesired effects, depending on the associated function.

In this case, it is necessary to make a certain compromise in that, on the one hand, as much actuation power is saved as possible but, on the other hand, the required holding force is not undershot. Since this compromise range is typically tolerance-dependent owing to manufacturing variation and in addition is dependent on the supply voltage and is temperature-dependent, a certain safety margin should be selected which counteracts this saving effect. This PWM safety margin can be set to be narrow or low as far as possible depending on the situation by means of the embodiments of the application.

In this case, it is assumed that, in the case of contactors which are typically constructed from copper windings, copper has a conductance which differs depending on temperature and therefore the actuation power is dependent on the winding temperature.

Owing to the conductivity of copper and its temperature co-efficient, a fluctuation in the winding resistance of −23% or +40% over a temperature range of from −40° C. to +120° C., for example, results for a specific relay using room temperature as a basis.

In accordance with embodiments of the application in which, for example, the copper winding temperature of a relay is known directly or indirectly or can be calculated, the pulse width modulation can be adjusted correspondingly, whereby the temperature influence can be virtually eliminated. Likewise, in accordance with embodiments of the application, it is possible for proceed with the supply voltage of the field winding of a relay. The higher this supply voltage is, i.e. the more power there is available, the longer the interpulse period can be set, which results in a reduction in power. This voltage tracking can take place either continuously with the change in voltage or incrementally.

Both the voltage and the temperature can in particular be measured either by means of an analog-to-digital converter in a microcontroller or can directly affect the PWM generator for the switching components by means of intelligent hardware circuitry.

In accordance with the embodiment shown in FIGS. 1A to 1C, in this case the two contactors or the two coils of a double contactor are supplied with PWM-controlled actuation. This is typically possible without any significant restrictions since the two contactors in the same surrounding environment and application also have a virtually identical supply voltage and winding temperature, apart from manufacturing tolerances.

If the winding temperature of the contactors is not measured directly, for example since this may be complex in particular when using a plurality of components, it is possible to draw a sufficiently accurate conclusion as to the winding temperature by means of a thermometer arranged centrally in the distribution unit by means of a computation model in a microcontroller, which uses the switch-on time as a computation basis, inter alia.

Furthermore, the embodiments of the application can be applied to high-voltage relays which have a built-in or built-on PWM power-saving disconnection with pulse width modulation after the switching operation with a fixed pulse width. For this purpose, preferably the electrical PWM generation for the actuation is designed in such a way that such relays can also be used. For this, bypassing the power-saving circuit and/or switch-off coding, for example in the form of wire jumpers, are provided, whereby the flexibility can be ensured without any changes to the layout.

Furthermore, the actuation unit 5 illustrated in FIGS. 1A to 1C can be used for a so-called dropout test. In this case, the interpulse periods of the PWM signal are increased continuously, for example, until the magnetic circuit of the relay can no longer be held and the relay therefore drops out, i.e. returns to the release state.

This dropout is identified by the electronics by means of a current measurement, for example. The point or the pulse-no-pulse ratio and therefore the winding supply at which the relay drops out is the present voltage for an operating state, i.e. temperature, and also individual winding tolerance, minimum possible setting. From this point on, it is possible to proceed with a greater or a lesser safety margin and the regulation already explained above in the form of voltage and temperature tracking.

The dropout test described is in this case typically provided in the case of circuits or consumers which tolerate a short-term off state. In this case, the dropout test is one possibility for determining the lower end of the actual system. Furthermore, the dropout test can be performed possibly at a time or in a system state at which or in which the controlled system has not fallen into an undesired mode.

A further energy saving during the operation of the vehicle electrical distribution system is possible by means of the described dropout test.

Figure 2:
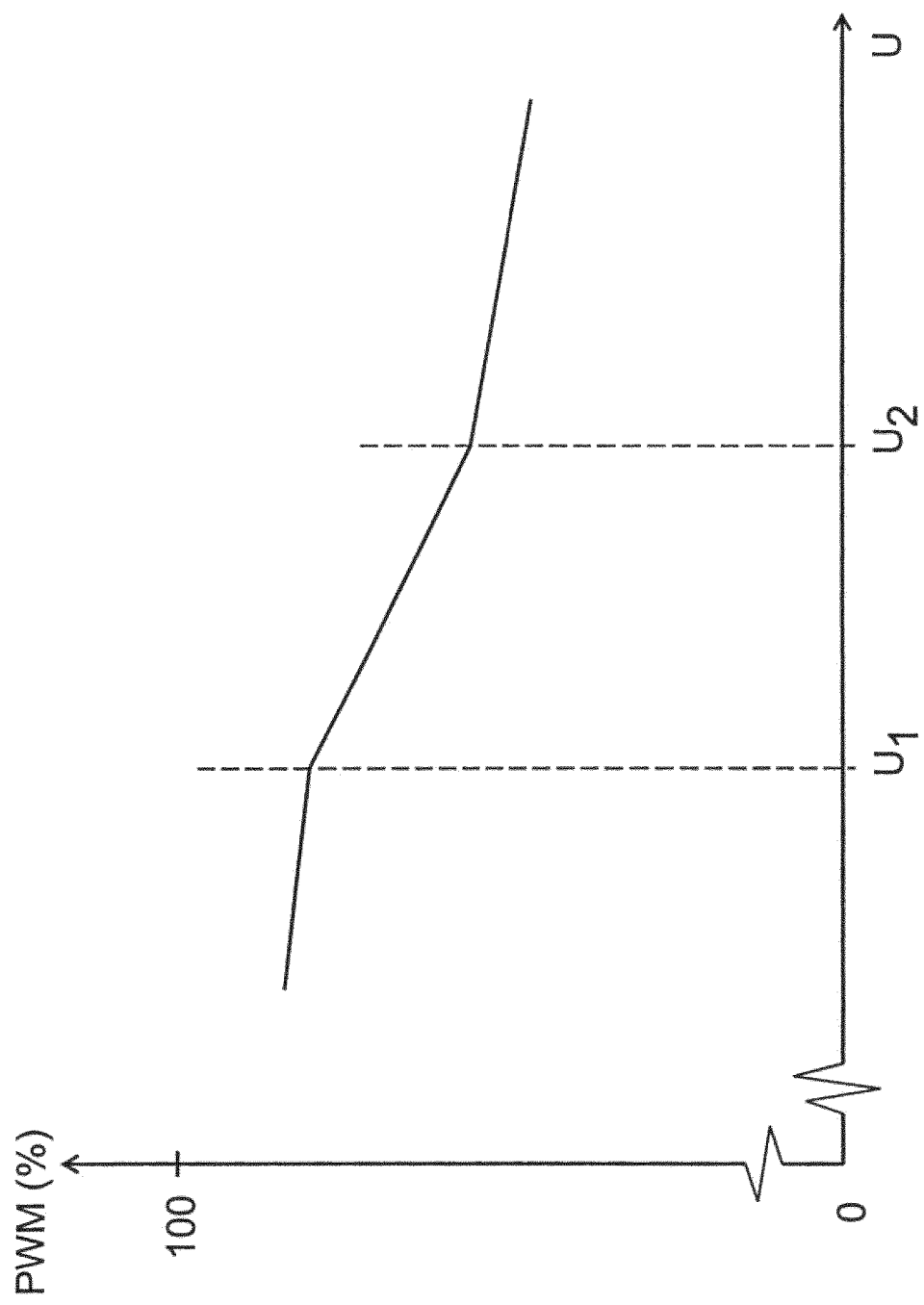
FIG. 2 shows a duty factor/voltage graph for a switching apparatus in accordance with one embodiment of the application.

FIG. 2 shows a duty factor/voltage graph for a switching apparatus in accordance with one embodiment of the application. In this case, the supply voltage of the field coil is illustrated on the X axis and the duty factor, i.e. the ratio between the switch-on time and the total duration of the actuation signal, is illustrated as a percentage on the Y axis.

As shown in FIG. 2, the duty factor/voltage characteristic in this embodiment includes three in each case linear subregions, wherein a small negative gradient is provided for a lower voltage range up to a lower voltage threshold $U_1$. In a central voltage range between the lower voltage threshold $U_1$ and an upper voltage threshold $U_2$, a curve with a steeper negative gradient is provided, which curve in turn becomes a linear subregion with a flat negative gradient in an upper voltage range above the upper voltage threshold $U_2$.

In further configurations, curves for the duty factor/voltage characteristic can also be set which are nonlinear. For example, sudden transitions or exponential curve profiles can be provided.

LIST OF REFERENCE SYMBOLS

1 Vehicle electrical distribution system
2 Vehicle electrical distribution branch
3 Energy storage apparatus
4 Switching apparatus
5 Actuation unit
6 Pulse width modulator
7 Field coil
8 Determination unit
9 Determination unit
10 Control line
11 Consumer
12 Distribution unit
13 Signal line
14 Signal line
15 Signal line
16 Signal line

The invention claimed is:

1. A vehicle electrical distribution system, comprising:
at least one vehicle electrical distribution branch;
at least one energy storage apparatus;
at least one switching apparatus configured to assume a first switch position and a second switch position, wherein, in the first switch position, said at least one energy storage apparatus is electrically connected to said at least one vehicle electrical distribution branch, and, in the second switch position, said at least one energy storage apparatus is electrically isolated from said at least one vehicle electrical distribution branch;
an actuation unit and a pulse width modulator for generating an actuation signal, said actuation unit being configured for actuating said at least one switching apparatus by way of the actuation signal, wherein a pulse width of the actuation signal is adjustable depending on at least one parameter selected from the group consisting of an instantaneous supply voltage of the at least one switching apparatus and an instantaneous temperature of the at least one switching apparatus.

2. The vehicle electrical distribution system according to claim 1, wherein said at least one switching apparatus is a relay or a contactor, and said actuation unit is configured to actuate a field coil of said at least one switching apparatus.

3. The vehicle electrical distribution system according to claim 2, which further comprises a first determination unit configured to determine at least one variable characterizing an instantaneous temperature of said field coil of said at least one switching apparatus.

4. The vehicle electrical distribution system according to claim 3, wherein said first determination unit includes a temperature sensor.

5. The vehicle electrical distribution system according to claim 3, wherein said first determination unit is configured to determine an instantaneous electrical resistance of said field coil of said at least one switching apparatus.

6. The vehicle electrical distribution system according to claim 1, which further comprises a second determination unit configured to determine an instantaneous supply voltage of said at least one switching apparatus.

7. The vehicle electrical distribution system according to claim 6, wherein said second determination unit is configured to determine an instantaneous supply voltage of said field coil of said at least one switching apparatus.

8. A vehicle, comprising a vehicle electrical distribution system according to claim 1.

9. A method of operating a vehicle electrical distribution system, the vehicle electrical distribution system having at least one vehicle distribution branch, at least one energy storage apparatus, and at least one switching apparatus configured to assume a first switch position and a second switch position, wherein, in the first switch position, the at least one energy storage apparatus is electrically connected to the at least one vehicle electrical distribution branch and, in the second switch position, the at least one energy storage apparatus is electrically isolated from the at least one vehicle electrical distribution branch, the method comprising the following steps:

generating an actuation signal by a pulse width modulator, for actuating the at least one switching apparatus;

determining at least one parameter, selected from the group consisting of an instantaneous supply voltage of the at least one switching apparatus and a variable characterizing an instantaneous temperature of the at least one switching apparatus; and adjusting a pulse width of the actuation signal depending on the at least one parameter.

10. The method according to claim 9, which comprises reducing a pulse width of the actuation signal on detecting an increased value for the instantaneous supply voltage and/or a reduced value for the instantaneous temperature.

11. The method according to claim 9, which comprises increasing a pulse width of the actuation signal on detecting reduced value for the instantaneous supply voltage and/or an increased value for the instantaneous temperature.

12. The method according to claim 9, wherein the at least one switching apparatus is a relay or a contactor, and the method comprises adjusting the pulse width of the actuation signal after a predetermined period of time following an actuation signal for pickup of the at least one switching apparatus.

13. The method according to claim 12, wherein the step of determining the parameter characterizing an instantaneous temperature of the at least one switching apparatus includes determining an instantaneous electrical resistance of a field coil of the at least one switching apparatus.

14. The method according to claim 12, wherein, if the at least one switching apparatus has been picked up, the method comprises the following further steps:

reducing the pulse width of the actuation signal;

determining whether the at least one switching apparatus has dropped out; and if the at least one switching apparatus has not dropped out, actuating the at least one switching apparatus by way of the actuation signal having the reduced pulse width.

15. The method according to claim 9, wherein the at least one switching apparatus is a relay or a contactor, and wherein, in addition, the method comprises determining whether a pickup of the at least one switching apparatus has taken place, and wherein the adjustment of the pulse width takes place if it is determined that a pickup of the at least one switching apparatus has taken place.

16. The method according to claim 15, wherein the step of determining the parameter characterizing an instantaneous temperature of the at least one switching apparatus includes determining an instantaneous electrical resistance of a field coil of the at least one switching apparatus.

* * * * *